United States Patent
Luo et al.

(10) Patent No.: US 9,267,602 B2
(45) Date of Patent: Feb. 23, 2016

(54) SEAL ASSEMBLY INCLUDING PARTIALLY FILLED GAPS

(71) Applicant: General Electric Company, Schenectady, NY (US)

(72) Inventors: Yuefeng Luo, Mechanisville, NY (US); William Edward Adis, Scotia, NY (US); Hrishikesh Vishvas Deo, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 13/680,697

(22) Filed: Nov. 19, 2012

(65) Prior Publication Data

US 2014/0138918 A1    May 22, 2014

(51) Int. Cl.
| | |
|---|---|
| F16J 15/16 | (2006.01) |
| F16J 15/44 | (2006.01) |
| F01D 11/02 | (2006.01) |
| F16J 15/32 | (2006.01) |

(52) U.S. Cl.
CPC .............. *F16J 15/16* (2013.01); *F16J 15/3292* (2013.01)

(58) Field of Classification Search
CPC ...... F16J 15/16; F16J 15/3288; F16J 15/3292
USPC .................................................. 277/345, 355
See application file for complete search history.

(56) References Cited

U.S. PATENT DOCUMENTS

| | | | |
|---|---|---|---|
| 6,267,381 B1 | 7/2001 | Wright | |
| 6,343,792 B1 * | 2/2002 | Shinohara et al. | 277/355 |
| 7,703,774 B2 | 4/2010 | Awtar et al. | |
| 8,272,644 B1 * | 9/2012 | Aho et al. | 277/355 |
| 2007/0102886 A1 * | 5/2007 | Uehara et al. | 277/355 |
| 2008/0007008 A1 * | 1/2008 | Hoebel et al. | 277/355 |
| 2008/0007009 A1 * | 1/2008 | Williams | 277/355 |

* cited by examiner

*Primary Examiner* — Vishal Patel
*Assistant Examiner* — Stacy Warren
(74) *Attorney, Agent, or Firm* — Ernest G. Cusick; Hoffman Warnick LLC

(57) ABSTRACT

A seal assembly between a rotor and a stator is disclosed. In one embodiment, the seal assembly includes: a rotor; a stator positioned around the rotor; and a plurality of seal leaves positioned between the rotor and the stator, the plurality of seal leaves circumferentially stacked around the rotor to define a seal ring between the rotor and the stator, wherein gaps between adjacent seal leaves are partially filled, such that contact faces and residual gaps are between adjacent seal leaves, wherein the contact faces generate friction to dampen vibrations during operation. Such damping effects still allow the compliant motion of the seal leaves with minimal leaf vibration. Also, thicker and more resilient leaves may be applied with reduced leakage through the root gaps.

8 Claims, 4 Drawing Sheets

SEAL ASSEMBLY INCLUDING PARTIALLY FILLED GAPS

TECHNICAL FIELD

The subject matter disclosed herein relates to turbines, and more particularly, to a seal assembly for a turbomachine.

BACKGROUND OF THE INVENTION

Dynamic sealing between a rotating shaft (i.e., a rotor) and a stator is an important concern in turbomachinery, such as steam turbines and other turbines. There are several different types of seals to reduce leakage and increase efficiency of the turbomachine, such as J seals, brush seals, and leaf/plate seals. J seals are radial rings which reduce the leakage channel between the rotor and stator. Brush seals and plate/leaf seals produce minimal leakage. Compliant plate/leaf seals fill the space between the rotor and the stator, and under fluid pressure, the leaf tips move compliantly to seal the rotor surface closely without direct contact. The compliant tip movement ensures minimum leakage and is resilient to high axial pressure. However, as seen in FIG. 1, in a conventional seal assembly, the diameter of a rotor 10 is smaller than the diameter of a stator 12. Therefore, when seal leaves 14 include a constant thickness, a root gap 16 exists.

Under high pressure, a small flow from the root gaps 16 allow for compliant motion to ensure proper sealing. However, the root gap 16 reduces the solidity of each seal leaf 14 and permits significant vibrations, which can lead to damaged seal leaves 14. If the seal leafs 14 were thicker, the seal leaves 14 would be more resilient, but a larger root gap 16 would be present and allow for more vibration effects and fluid leakage.

BRIEF DESCRIPTION OF THE INVENTION

A seal assembly for reducing leakage between a rotor and a stator is disclosed. In one embodiment, the seal assembly includes: a rotor; a stator positioned around the rotor; and a plurality of seal leaves positioned between the rotor and the stator, the plurality of seal leaves circumferentially stacked around the rotor to define a seal ring between the rotor and the stator, wherein root gaps between adjacent seal leaves are partially filled, such that contact faces and residual gaps are between adjacent seal leaves, wherein the contact faces generate friction to dampen vibrations during operation. Such damping effects still allow the compliant motion of the seal leaves with minimal leaf vibration. Also, thicker and more resilient leaves may be applied with reduced leakage through the root gaps.

A first aspect of the disclosure provides a seal between a rotor and a stator, comprising: a plurality of seal leaves positioned between the rotor and the stator, the plurality of seal leaves circumferentially stacked around the rotor to define a seal ring between the rotor and the stator, wherein gaps between adjacent seal leaves are partially filled, such that contact faces and residual gaps are between adjacent seal leaves, wherein the contact faces generate friction to dampen vibrations during operation.

A second aspect provides a seal assembly between a rotor and a stator, comprising: a rotor; a stator positioned around the rotor; and a plurality of seal leaves positioned between the rotor and the stator, the plurality of seal leaves circumferentially stacked around the rotor to define a seal ring between the rotor and the stator, wherein gaps between adjacent seal leaves are partially filled, such that contact faces and residual gaps are between adjacent seal leaves, wherein the contact faces generate friction to dampen vibrations during operation.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
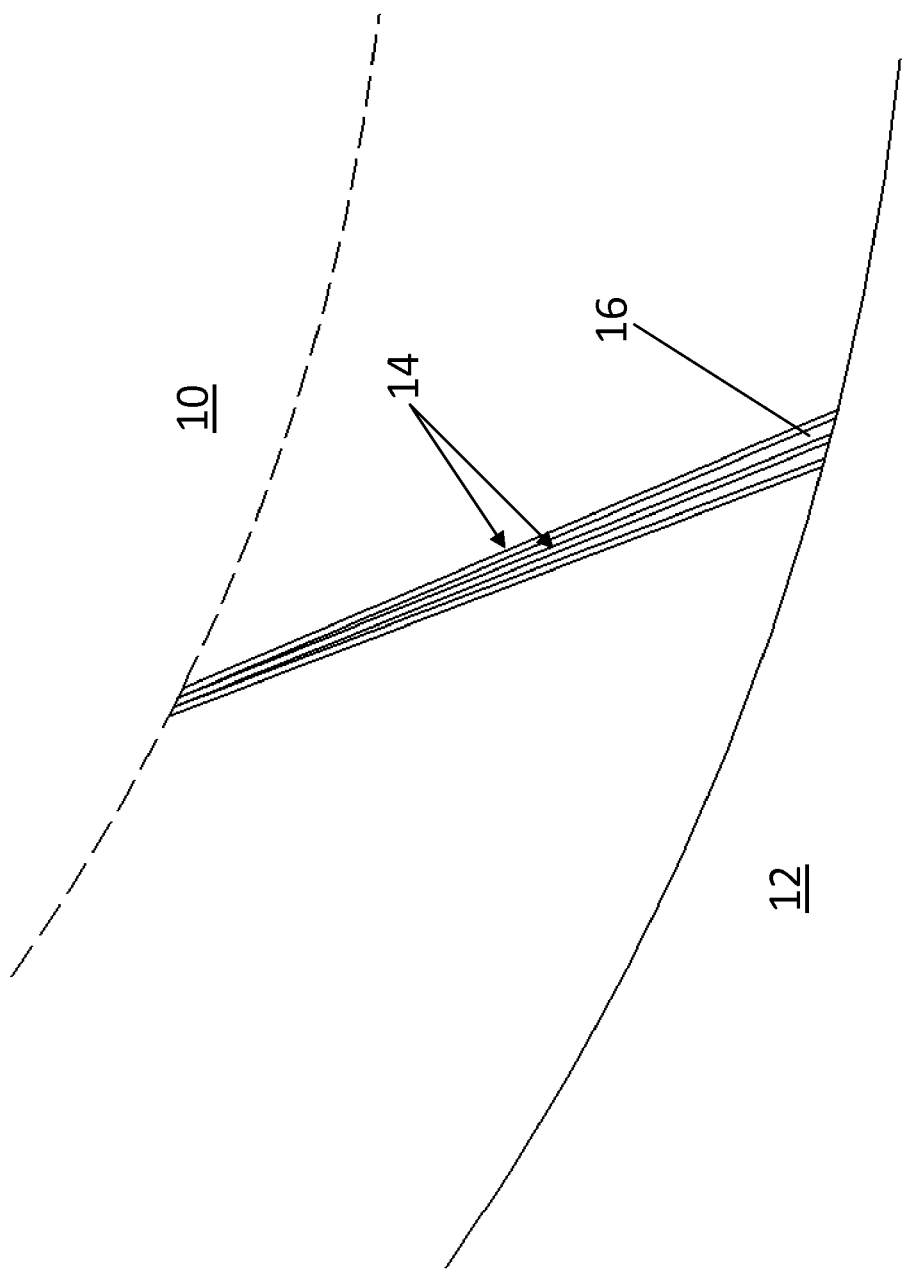
FIG. 1 shows a partial cross-sectional view of a conventional plate seal assembly.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated, the subject matter disclosed herein relates to turbines, and more particularly, to a seal assembly for a turbomachine.

Dynamic sealing between a rotating shaft (i.e., a rotor) and a stator is an important concern in turbomachinery. Seal leaves fill the space between the rotor and the stator, and under fluid pressure, the leaf tips move compliantly to seal the rotor surface closely without direct contact. However, as seen in FIG. 1, in a conventional plate seal assembly, the diameter of a rotor 10 is smaller than the diameter of a stator 12. Therefore, when seal leaves 14 include a constant thickness, a root gap 16 exists.

Under high pressure, a small flow from the root gaps 16 allow for compliant motion to ensure proper sealing. However, the root gap 16 reduces the solidity of each seal leaf 14 and permits significant vibrations, which can lead to damaged seal leaves 14. If the seal leaves 14 were thicker, the seal leaves 14 would be more resilient and durable, but a larger root gap 16 would be present and allow for more fluid leakage. Thus, the thicker seal leaves 14 are less susceptible to damage but not applicable due to the increased leakage. Therefore, a seal assembly that allows for thicker seal leaves 14 with a root gap 16 that provides proper sealing to reduce leakage between a rotor 10 and a stator 12, and to dampen vibrations to minimize damage to seal leaves 14 is needed.

A seal assembly for reducing leakage between a rotor and a stator is disclosed. In one embodiment, the seal assembly includes: a rotor; a stator positioned around the rotor; and a plurality of seal leaves positioned between the rotor and the stator, the plurality of seal leaves circumferentially stacked around the rotor to define a seal ring between the rotor and the stator, wherein gaps between adjacent seal leaves are partially filled, such that contact faces and residual gaps are between adjacent seal leaves, wherein the contact faces generate friction to dampen vibrations during operation. Contact faces within the root gap operate to provide the necessary damping and solidity to ensure minimal damage to each seal leaf. Such damping effects still allow the compliant motion of the seal leaves with minimal leaf vibration. Also, thicker and more resilient leaves may be applied with reduced leakage through the root gaps.

Figure 2:
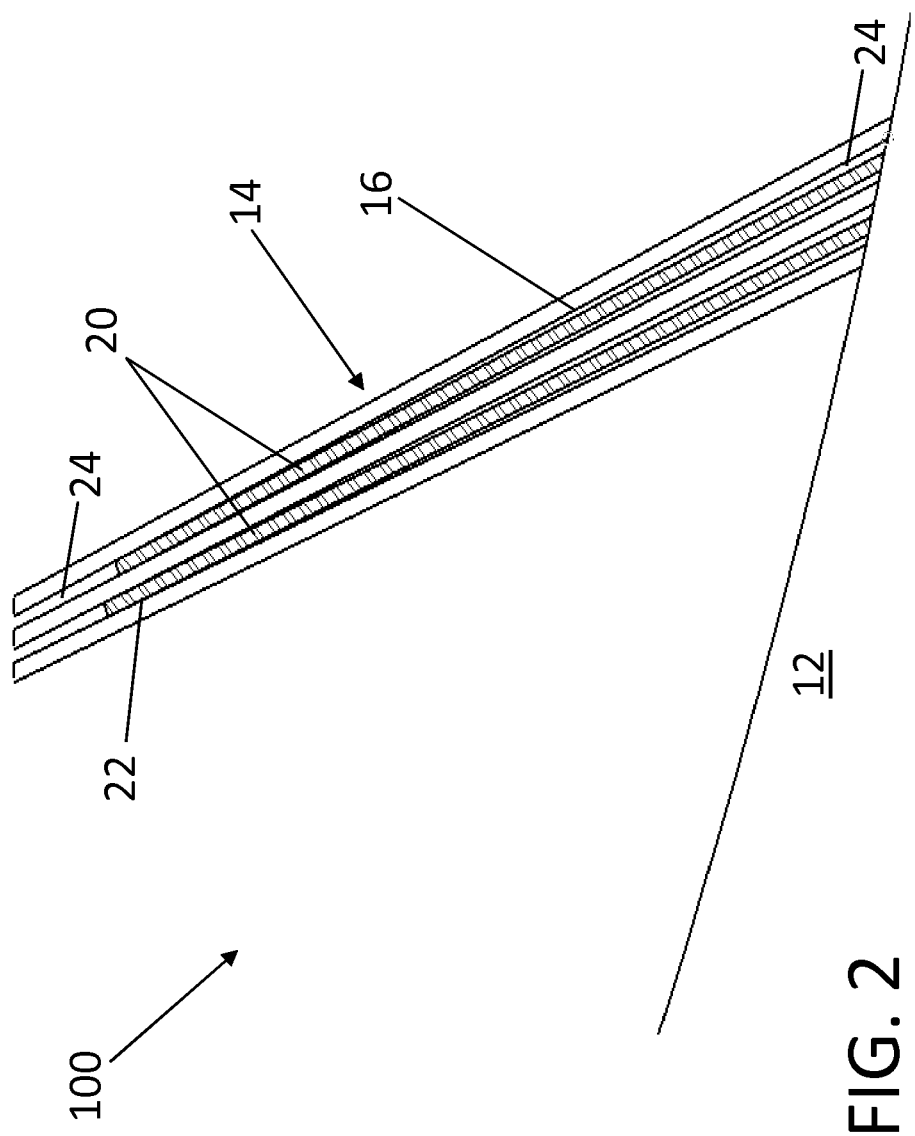
FIG. 2 shows a partial cross-sectional view of a seal assembly according to embodiments of the invention.

Turning now to FIG. 2, a partial cross-sectional view of a seal assembly 100 according to embodiments of the invention is shown. As seen in FIG. 2, a plurality of seal leaves 14 are positioned between the rotating shaft 10 (not shown) and the stator 12. The plurality of seal leaves 14 is circumferentially stacked around the rotating shaft 10 to define a seal ring (not shown) between the rotating shaft 10 and the stator 12. Although only three seal leaves 14 are depicted in FIG. 2, it is understood that seal assembly 100 may include any number of seal leaves 14 and that three seal leaves 14 are shown for clarity purposes only. Further, it is understood that seal leaves 14 may include any thickness, as required for different design needs. Seal leaves 14 may include any width and side features which allow for compliant motion.

As mentioned above, each of the seal leaves 14 includes a constant thickness along the length of the seal leaf 14. Since the diameter of the stator 12 is larger than the diameter of the rotating shaft 10, a root gap 16 is formed between adjacent seal leaves 14. Although only two root gaps 16 are shown, since only three seal leaves 14 are shown, it is understood that a root gap 16 may be between every adjacent seal leaf 14 around rotating shaft 10. It is understood that actual root gaps 16 and leaf 14 thickness are smaller than as shown in the figures. These features have been amplified in the figures for clarity purposes only.

In this embodiment of seal assembly 100 shown in FIG. 2, the root gap 16 is partially filled with a shim 20. Each shim 20 is shorter in length than each of the seal leaves 14. Therefore, the root gap 16 is only partially filled. There are residual gaps 24 at the top of root gap 16 towards rotating shaft 10 and residual gaps 24 between the seal leaf 14 and the shim 20 towards the stator 12. Each shim 20 is attached to the stator 12 (i.e., the stator ring, which is mounted on stator 12). In structural vibration and compliant motion, friction takes place at contact faces 22 to provide the necessary damping of the vibrations. Residual gaps 24 allow for the compliant motion of seal leaves 14 to ensure proper sealing. Therefore, compliant motion (via residual gaps 24) and vibration damping (via contact faces 22) are simultaneously provided.

The length and thickness of the shims 20 are adjustable to allow for various residual gaps 24 (and various contact faces 22), and will depend on the design needs of the seal assembly 100 to the rotor 10. A thicker shim 20 will provide more damping and more solidity (i.e., more contact faces 22 and less residual gaps 24), but also provide more stability and flexibility for compliant motion. Shims 20 may be attached to stator 12 (i.e., stator ring) by any attachment method, as known in the art, such as, but not limited to, welding.

Figure 3:
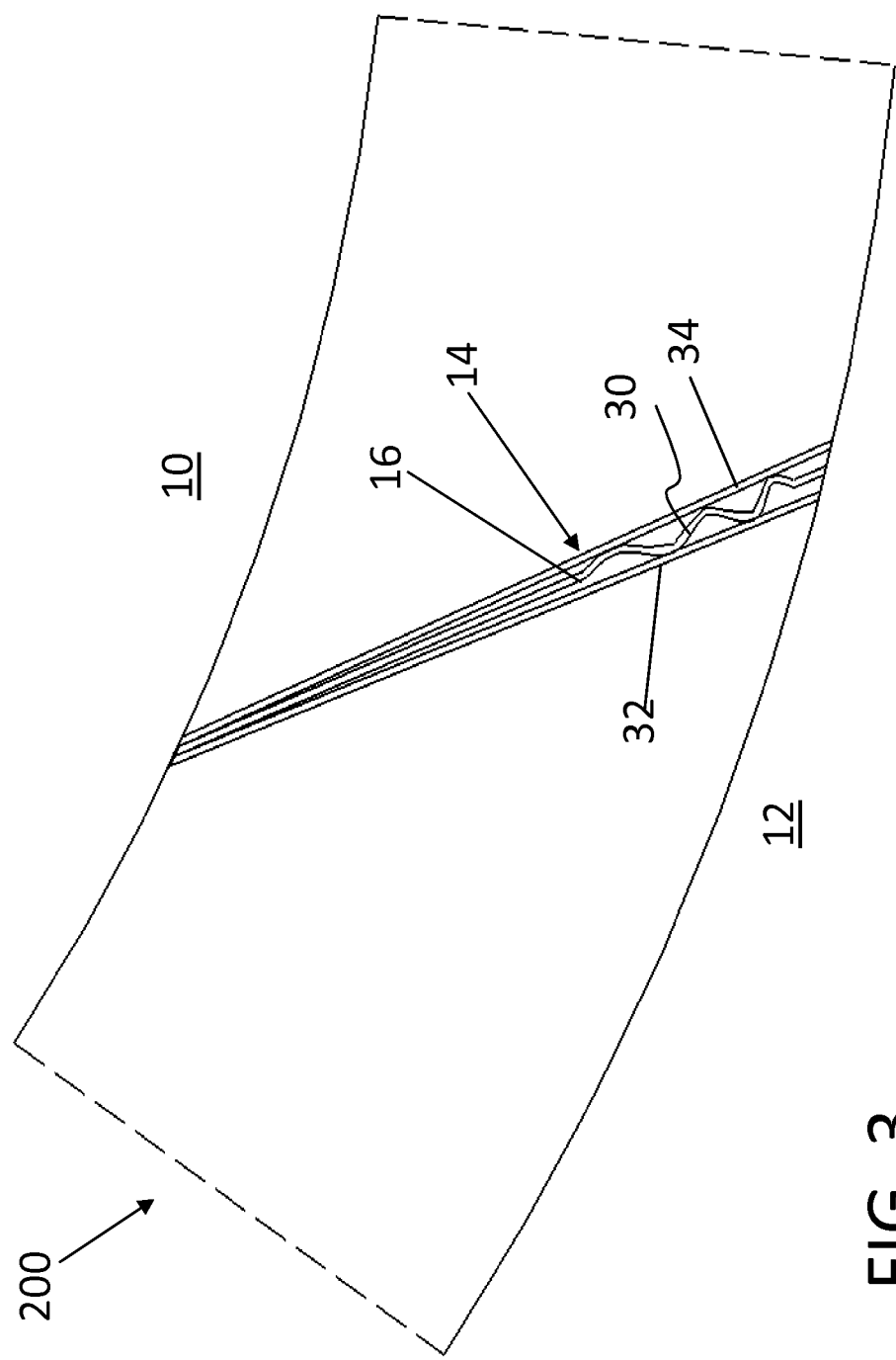
FIG. 3 shows a partial cross-sectional view of a seal assembly according to embodiments of the invention.

Turning now to FIG. 3, a partial cross-sectional view of a seal assembly 200 according to embodiments of the invention is shown. Seal assembly 200 includes similar features of seal assembly 100, such as rotor 10, stator 12, seal leaves 14, and root gap 16. However, in this embodiment shown in FIG. 3, root gaps 16 are partially filled with a formed seal leaf 30 between adjacent seal leaves 14. That is, a portion of the formed seal leaf 30 includes at least one formed shape. As shown in FIG. 3, a portion of the formed seal leaf 30 includes a continuous wave shape. However, it is understood that the at least one formed shape may include a non-continuous, and random, wave pattern. Further, it is understood that the at least one formed shape may include any shape. The portion of the formed seal leaf 30 is at the larger end of root gap 16, which is closer to the stator 12.

The formed seal leaf 30 is longer than the plurality of seal leaves 14. However, a portion of the formed seal leaf 30 is bent into a continuous wave shape, or any other shapes, so that it is the same length as the plurality of seal leaves 14. The continuous wave shape of a portion of the formed seal leaf 30 creates contact faces 32 and residual gaps 34. The contact faces 32 provide friction for vibration damping during operation. A shorter interval between waveforms in the continuous wave shape (i.e., more "waves") provides more contact faces 32 and smaller residual gaps 34. This would provide higher seal leaf 14 solidity and durability, but more stability and flexibility to allow for compliant motion of each seal leaf 14. Therefore, compliant motion (via residual gaps 34) and vibration damping (via contact faces 32) are simultaneously provided. Formed seal leaf 30 may be formed using any now known or later development method, such as, but not limited to, stamping and/or embossing.

Figure 4:
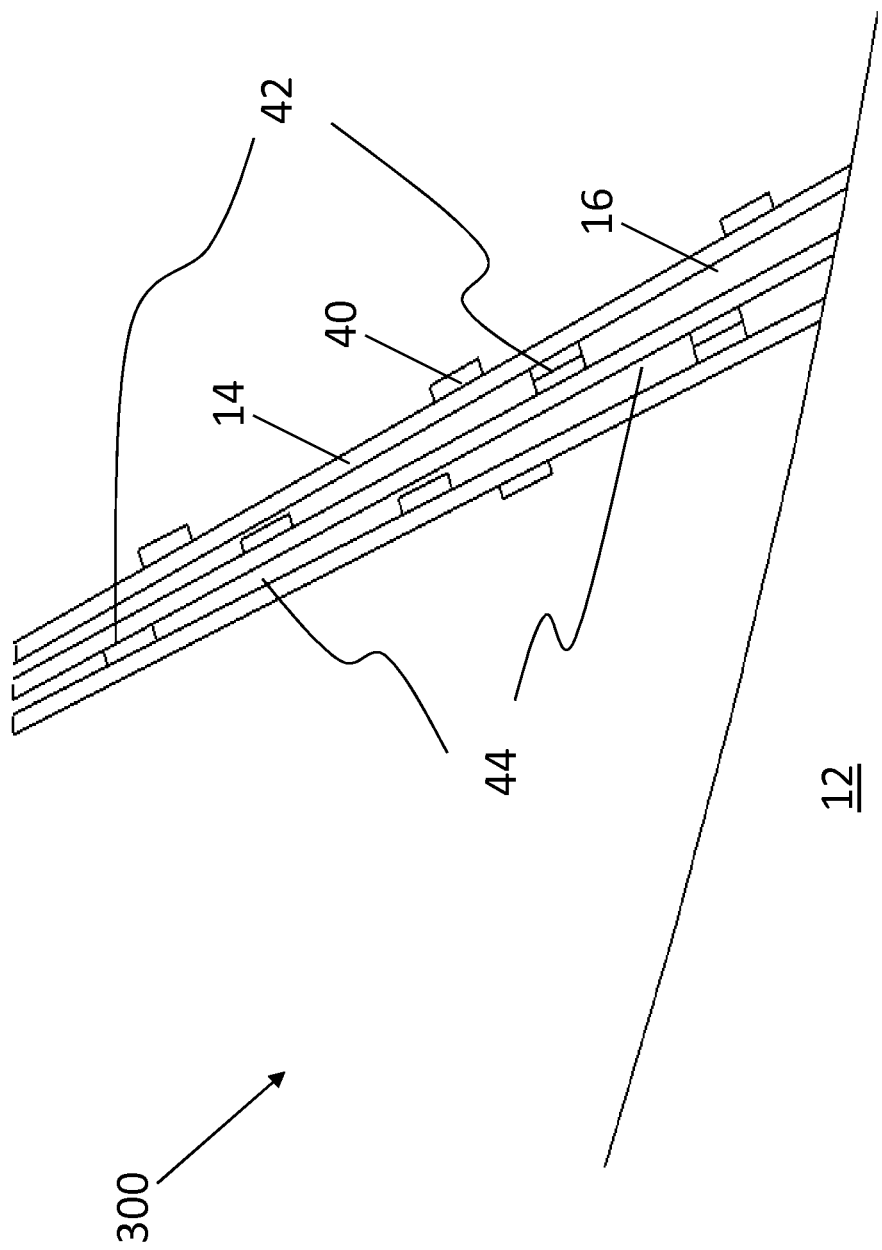
FIG. 4 shows a partial cross-sectional view of a seal assembly according to embodiments of the invention.

Turning now to FIG. 4, a partial cross-sectional view of a seal assembly 300 according to embodiments of the invention is shown. Seal assembly 300 includes similar features of seal assembly 100 and seal assembly 200, such as rotor 10, stator 12, seal leaves 14, and root gap 16. However, in this embodiment shown in FIG. 4, root gaps 16 are partially filled with a plurality of protrusions 40 on a surface of each of the seal leaves 14.

The plurality of protrusions 40 are shown in FIG. 4 as strips (i.e., rectangles). However, it is understood that the plurality of protrusions 40 may include any shape, such as, a pad (i.e., ball shape), or any other shape. Also, it is understood that the plurality of protrusions 40 are solid and may be in any pattern along the surface on each seal leaf 14. That is, the plurality of protrusions 40 may be in a continuous or a random pattern. Contact faces 42 are formed between protrusions 40 on adjacent seal leaves 14 or between a protrusion 40 on a seal leaf 14 and the surface of an adjacent seal leaf 14. The plurality of protrusions 40 may be on either surface of each of the seal leaves 14.

In this embodiment, a larger number of protrusions 40 would increase the contact faces 42 and reduce the residual gaps 44. This would provide higher seal 14 solidity and promote higher damping to vibrations by friction. However, the seal leaves 14 would be subject to a more stability and flexibility to allow for compliant motion. Therefore, compliant motion (via residual gaps 44) and vibration damping (via contact faces 42) are simultaneously provided. The plurality of protrusions 40 may be formed using any now known or later developed method, such as, but not limited to, a patterned vacuum plasma deposition and/or electro-deposition.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal between a rotor and a stator, comprising:
a plurality of seal leaves positioned between the rotor and the stator, the plurality of seal leaves circumferentially stacked around the rotor to define a seal ring between the rotor and the stator, wherein each seal leaf includes opposite surfaces with a constant thickness between the surfaces along a length of the seal leaf, each surface having a plurality of solid protrusions extending therefrom, each solid protrusion having a contact face,
wherein gaps between adjacent seal leaves are partially filled, such that residual gaps are between adjacent seal leaves, wherein the contact faces of the solid protrusions contact one of the surfaces of an adjacent seal leaf or the contact face of one of the solid protrusions on the adjacent seal leaf and generate friction to dampen vibrations during operation.

2. The seal of claim 1, wherein the residual gaps allow for compliant motion of the plurality of seal leaves to reduce leakage during operation.

3. The seal of claim 1, wherein the plurality of solid protrusions includes strips.

4. The seal of claim 1, wherein the plurality of solid protrusions includes pads.

5. A seal assembly between a rotor and a stator, comprising:
a rotor;
a stator positioned around the rotor; and
a plurality of seal leaves positioned between the rotor and the stator, the plurality of seal leaves circumferentially stacked around the rotor to define a seal ring between the rotor and the stator, wherein each seal leaf includes opposite surfaces with a constant thickness between the surfaces along a length of the seal leaf, each surface having a plurality of solid protrusions extending therefrom, each solid protrusion having a contact face,
wherein gaps between adjacent seal leaves are partially filled, such that residual gaps are between adjacent seal leaves, wherein the contact faces of the solid protrusions contact one of the surfaces of an adjacent seal leaf or the contact face of one of the solid protrusions on the adjacent seal leaf and generate friction to dampen vibrations during operation.

6. The seal of claim 5, wherein the residual gaps allow for compliant motion of the plurality of seal leaves to reduce leakage during operation.

7. The seal assembly of claim 5, wherein the plurality of solid protrusions includes strips.

8. The seal assembly of claim 5, wherein the plurality of solid protrusions includes pads.

* * * * *